UNITED STATES PATENT OFFICE.

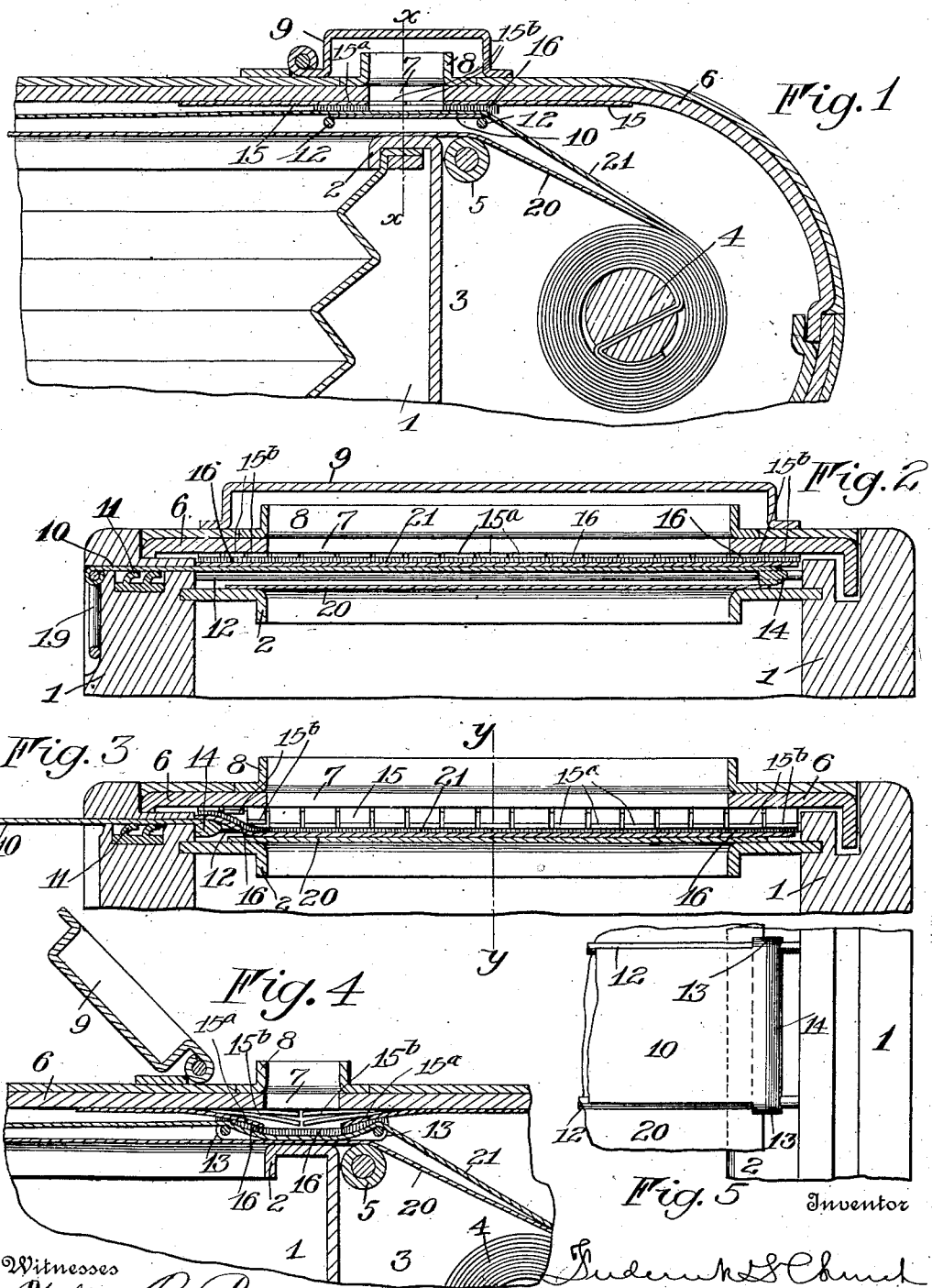

FREDERICK F. CHURCH, OF ROCHESTER, NEW YORK, ASSIGNOR TO EASTMAN KODAK COMPANY, OF ROCHESTER, NEW YORK, A CORPORATION OF NEW YORK.

HOLDER FOR PHOTOGRAPHIC MATERIAL.

1,202,160.  Specification of Letters Patent.  Patented Oct. 24, 1916.

Application filed August 7, 1914. Serial No. 855,541.

*To all whom it may concern:*

Be it known that I, FREDERICK F. CHURCH, of Rochester, in the county of Monroe and State of New York, have invented certain new and useful Improvements in Holders for Photographic Material; and I do hereby declare the following to be a full, clear, and exact description of the same, reference being had to the accompanying drawings, forming a part of this specification, and to the reference-numerals marked thereon.

My invention relates to cameras or holders for sensitized photographic material adapted particularly for light printing upon the film or sensitized material while in the holder suitable indicia such as names, or other data regarding the exposure made or to be made, and it consists generally in the provision of means whereby designating marks may be formed upon suitable material while in position over the film and then exposed to light to print the same or a representation thereof through the back of the film all as hereinafter described.

In the drawings: Figure 1 is an enlarged longitudinal sectional view of a portion of the back of a holder or camera embodying my invention; Fig. 2 is a cross sectional view on the line $x$—$x$ with the outer cover or door closed; Fig. 3 is a similar view showing the cover or door open, the film clamped and the shutter removed for light printing on the film; Fig. 4 is a longitudinal sectional view on the line $y$—$y$ of Fig. 3, and Fig. 5 is a plan view of a portion of the shutter covering the film.

Similar reference numerals throughout the several views indicate the same parts.

I have shown my invention applied to a camera or holder of the usual type, in which the film or sensitized medium is passed from one chamber to another across the usual exposure aperture arranged between them, the walls bounding the latter constituting a part of or adapted to be connected with, the rear end of the camera or bellows.

1 indicates the body of the holder and 2 the flange formed thereon at the end of the exposure opening, and to which the camera bellows is attached or with which it coöperates as shown.

3 indicates a chamber in which one of the film spools 4 is supported on suitable centers and 5 a roller at the edge thereof.

6 indicates the usual removable cover for the rear side of the camera or holder and coöperating with the end and side walls to form a light tight joint. Arranged in the rear of the holder or camera, and in the present instance in the cover 6, is an aperture 7 surrounded by an upwardly extending flange 8 and preferably arranged over the flange 2 which constitutes one end of the opening through which an exposure of the film is made in taking pictures. The aperture 7 is preferably covered by a removable hinged cover plate 9 and extends practically the whole width of the film and is of a size sufficient to permit the introduction of the end of a pencil, stylus or crayon so that the operator may write upon material placed beneath the opening, as hereinafter described.

10 indicates a shutter or septum mounted in the holder and adapted to be moved beneath or away from the opening 7 in the outer wall of the holder, and in this instance serves both as a means for excluding light and also as a support for the material to be written upon. In the present instance this consists of a metal plate having an operating handle 19 and passing through a slot in the casing and removable from beneath said aperture when desired, the entrance of light to the interior of the holder being prevented by the excluding flexible flaps 11 or other suitable light trap. This slide or platen is, in the construction shown, guided for horizontal movement upon rods or guides 12 secured in the casing and is provided with ears or lugs 13 near the inner end encircling said guides, and the end 14 is somewhat beveled, as shown, to insure the separation of the film and its translucent covering of paper. Arranged beneath the aperture 7 and secured at the sides thereof are spring plates 15 movable toward the film and provided on the under side with a covering 16 of velvet or felt, said plates being preferably slit at their edges, as shown, forming a plurality of independently movable fingers 15ª and 15ᵇ so that when the slide or platen is moved inwardly on its guides beneath them, the different parts or fingers will be lifted successively and the entrance of light to the adjacent portions of the film prevented. The fingers 15ᵇ which are beyond the ends of the apertures 7, as shown in Figs. 2 and 3, may be made to almost meet each other but the intermediate fingers 15ª are shorter and do not project beyond the longitudinal edges of the apertures, as shown in Figs. 1 and 4, as otherwise they would interfere with the writing implement and obstruct the surface to be written upon.

The film cartridge adapted to be used with this holder embodies the usual transparent film 20, with which is wound a strip 21 of such nature that indicia may be placed or formed upon it through the aperture 7 by means of a pencil or stylus in the hand of the operator and such indicia caused to be light printed upon the film by light passing through said aperture. This strip 21 may be composed of red or other colored paper or material, a single thickness of which will permit the passage of light of sufficient actinic value to fog the film, or it may be of white paper or of material having a coating adapted to be displaced by the point of the pencil or stylus and thereby rendered translucent on the lines traced thereby, it being sufficient, as before stated, that after the characters or designations are placed upon it, light passing through the aperture will cause the designations to appear in the negative, either as transparent lines on an opaque background or vice versa.

When the holder or camera is in condition for making exposures in the ordinary way the parts are in the position shown in Fig. 1, the slide 10 being pushed in beneath the opening 7 and when the operator desires, the door or cover 9 is opened and any desired indicia or designating marks are made upon the strip 21 which, at this time, is supported by the plate 10 and the film is covered by the latter. In order to cause these designations to be light printed upon the film, the plate or septum 10 is withdrawn to the position shown in Fig. 3, allowing the spring fingers 15ª to move downward or toward the film and press the strip 21 into contact therewith, as shown particularly in Figs. 3 and 4, the fingers following behind the plate as it is withdrawn and effectually preventing light entering through the aperture 7 extending beyond the sides thereof to the film in the casing. The light permitted to pass through the strip 21 to the film causes the designations previously formed upon the strip to be light printed, and as these designations usually appear between the separate exposures of film they will not in any way interfere with the exposure or negative. As the strip 21, the ends of which form the covering for the cartridge when wound into a roll, is a trifle wider than the film, the edge thereof may be placed above the beveled end of the platen as shown in Fig. 3 so that when the latter is moved inward it will readily pass between the film and strip.

Although in the present embodiment I have shown the septum 10 as movable laterally of the direction of the movement of the film, this is not essential, as it could be otherwise arranged though I prefer that at least the actuating member or a part serving as an indicator be visible at the exterior of the holder, in order that the position of the septum relative to the aperture 7 be indicated to the operator, that he may not expose the film to light excepting when it is intended to print designations on the film. The external door or cover 9 could be dispensed with if desired, and the septum 10 serve as the only light excluding cover for the film.

It will be noted that the septum 10 in the present embodiment, serves as also a table or support for the strip 21 while it is being written upon, which is advantageous in that said strip may, though sufficiently translucent in single thickness to permit light printing through it, serve as the outer cover for the film cartridge, a plurality of such thicknesses serving the same purpose as the ends of the ordinary black paper covering for film cartridges and enabling the holder or camera to be loaded in daylight.

I claim as my invention:

1. A holder for photographic sensitized material provided with an aperture in rear of the material to be exposed, and a septum or shutter arranged in the holder and movable beneath and away from said aperture and adapted when beneath the same to extend between the sensitized material and a strip of material extending over the same.

2. A roll holder for photographic film provided with an aperture in rear of the film, a septum or shutter arranged in the holder and movable beneath and away from the aperture, said septum being free at its edges to permit the passage over it of a strip of material associated and movable with the film.

3. In a holder for film cartridges composed of a strip of flexible photographic film and translucid flexible strip associated therewith, the combination with the casing having an aperture in rear of the film, of a septum movable beneath said aperture and into and out of line with the same and supported to extend between the film and the flexible strip when in such first mentioned position.

4. In a film roll holder, the combination of a casing provided with an aperture in rear of the film, a septum supported in the holder and movable into and out of line with said aperture, and a movable strip of translucid material adapted to receive designating markings thereon extending beneath said aperture and over said septum.

5. The combination in a film holder of a casing having an aperture in rear of the film, a support in rear of the film and in line with said aperture for a strip containing indicia adapted to be light printed on the film and means arranged between said strip and the film for excluding or admitting to the film light passing through said strip.

6. A film holder embodying a casing having an aperture in rear of the film, a septum arranged in the holder in rear of the film and movable into and out of line with the aperture, in combination with a strip of translucent material adapted to receive markings extending over said septum.

7. A roll film holder embodying a casing having an aperture in rear of the film and a septum in the holder movable into and out of line with said aperture, in combination with a film cartridge embodying a strip of flexible film and a flexible strip of translucent material adapted to receive markings thereon, said film extending beneath and the said translucent strip extending over said septum when the latter is in line with the aperture.

8. In a roll film holder, the combination with a casing having an aperture in the rear thereof, a septum movable into and out of line with said aperture, said septum being free at its edges to permit the passage of a strip of flexible material between it and the outer side of the casing when the septum is in line with the aperture and yielding light excluding means arranged between said septum and the edges of the aperture.

9. A holder for flexible photographic film cartridges embodying a casing having an aperture at the rear, a septum movable into and out of line with said aperture, and light excluding devices between the edge of the aperture and septum, in combination with a film cartridge embodying a strip of flexible material adapted to receive markings extending over the septum and a strip of sensitive film extending beneath said septum when the latter is in line with the aperture.

10. In a roll film holder, the combination with the casing having an aperture in the rear, a septum movable into and out of line with the aperture, guides for the sides of the septum separated from the outer edges of the aperture and yielding means arranged between the edges of the aperture permitting the passage of a flexible strip between the casing and septum when the latter is in line with the aperture but preventing the passage of light into the holder.

11. In a roll holder for film, the combination of the casing having an aperture in the rear thereof, guides at the side of said aperture and extending transversely of the movement of the film, a septum mounted on the guides and movable into and out of line with the aperture, the sides of the septum being free to permit the passage of a flexible strip between it and the outer portion of the casing when the septum is in line with the aperture.

12. In a roll holder for film, the combination with the casing having an aperture in the rear thereof, of a septum having an inclined end mounted in the holder and movable transversely of the direction of movement of the film into and out of line with said aperture.

13. In a roll holder for film, a combination with the casing having an aperture in the rear thereof, and light excluding flaps at the edges of said aperture, of a septum having an inclined end engaging the flaps and movable into and out of line with the aperture, said septum being supported to permit the passage of a flexible strip between it and the outer portion of the casing when the septum is in line with the aperture.

14. A holder for photographic sensitized material provided with an aperture in proximity to the material to be exposed, said aperture being accesssible from the exterior of the holder, and a septum or shutter operable from the exterior of the holder and movable beneath and away from said aperture, and adapted when beneath the aperture to extend between the sensitized material and a strip located beneath the aperture and adapted to receive markings thereon.

15. A photographic exposure holder having an aperture in one of its walls, means for supporting sensitized material and a backing sheet of non-sensitized translucid material in said holder beneath said aperture, and a septum or shutter movable from a position out of line with said aperture into a position within said holder in line with said aperture and between said sensitive material and said backing.

16. A photographic roll holder having an aperture in one of its walls, means for supporting a sensitive film strip and a translucid non-sensitized backing strip in said holder beneath said aperture, and a septum or shutter movable from a position out of line with said aperture into a position within said holder in line with said aperture and between said sensitive film strip and said backing strip, said septum being free at its edges to permit passage of said sensitive film strip and said backing strip.

17. In a camera having a record exposure slot, and a film extending across the slot, the film consisting of a sensitized band accompanied by a non-sensitized covering, the latter being outside and made of material which is partially permeable by light, a plate riding between the sensitized band and the covering and adapted to close the slot, and means for withdrawing the plate.

FREDERICK F. CHURCH.

Witnesses:
HARRIET T. VAY,
HENRY W. HALL.